INVENTOR
JOHN R. McWHIRTER
BY John C. Tidwell
ATTORNEY

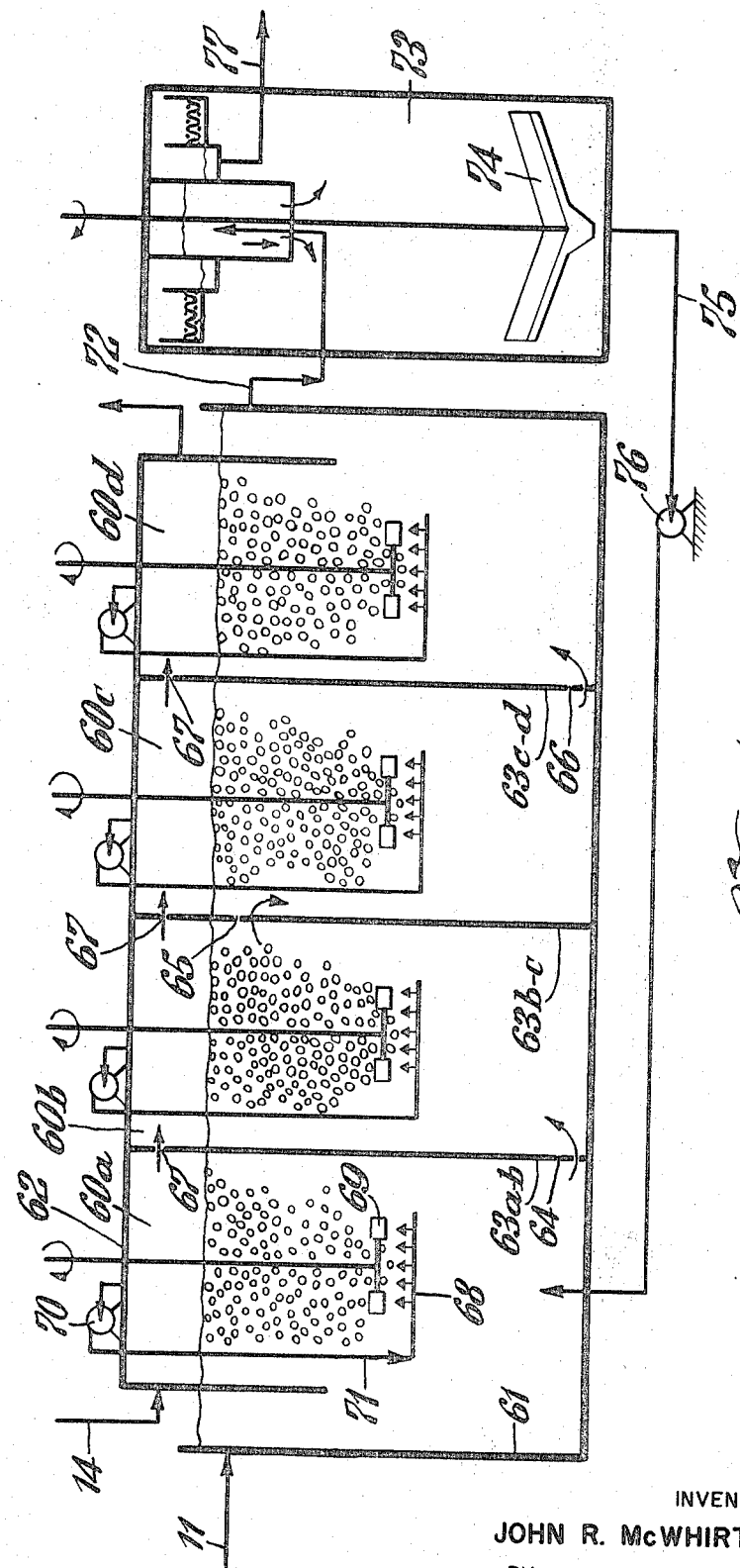

United States Patent Office 3,547,814
Patented Dec. 15, 1970

3,547,814
BIO-OXIDATION WITH LOW SLUDGE YIELD
John R. McWhirter, Williamsville, N.Y., assignor to Union Carbide Corporation, New York, N.Y., a corporation of New York
Filed July 2, 1969, Ser. No. 838,499
Int. Cl. C02c 1/06
U.S. Cl. 210—7                                13 Claims

ABSTRACT OF THE DISCLOSURE

BOD-containing water such as sewage is mixed with oxygen gas and activated sludge in contact aeration and sludge stabilization steps and the resulting BOD-depleted sludge thereafter mixed with additional oxygen gas in an auto-oxidation zone to form partailly auto-oxidized sludge.

CROSS-REFERENCES TO RELATED APPLICATIONS

The following applications relating to oxygenation of BOD-containing water were filed simultaneously with this application:
Ser. No. 838,442, Cyclic Oxygenation of BOD-Containing Water, J. R. McWhirter; Ser. No. 838,467, High Oxygen Utilization in BOD-Containing Water Treatment, J. R. McWhirter; Ser. No. 838,498, Biochemical Oxidation With Low Sludge Recycle, E. K. Robinson and J. R. McWhirter; Ser. No. 838,500, Stage Oxygenation of BOD-Containing Water, J. R. McWhirter.

BACKGROUND OF THE INVENTION

This invention relates to a bio-oxidation method for achieving a relatively low net yield of sludge derived from BOD-containing water, e.g. municipal sewage and chemical waste from petrochemical or paper plants.

Waste treatment has the broad objective of reducing the waste product's characteristic affinity for oxygen, usually quantitatively measured and expressed as a biochemical oxygen demand (BOD), i.e. parts of oxygen required to render the waste product innocuous per million parts of waste product. One commonly employed process for the reduction of BOD is the activated sludge process wherein the gross solids are first removed as for example by screening, and the remaining waste mixed with oxygen-containing gas and activated sludge. The latter consists essentially of aerobic organisms which have the ability, in the presence of sufficent dissolved oxygen, to adsorb and assimilate the organic material of the waste, thereby converting the organic material to forms which can be separated readily from the purified water. Under normal conditions the bacteria multiply rapidly in the aeration tanks during this treatment step. When the requisite period of BOD conversion is completed, the mixed liquor is settled, the purified effluent decanted to receiving waters and sludge is withdrawn from the bottom of a clarifier.

A portion of the sludge must be recirculated to the inlet of the treatment tank to innoculate the incoming BOD-containing water. In the usual practice the recycled sludge cannot constitute 100% of the sludge withdrawn from the clarifier or the sludge inventory in the system will gradually build to intolerable levels and will overload the clarifier system. Perhaps only about 90% of the sludge may be recycled leaving at least 10% to be discarded. Accordingly there is a substantial net production of sludge from the conventional activated sludge process.

Unfortunately this excess sludge must be further treated to render it non-putrescible before disposition. One commonly employed method is anaerobic (without oxygen) digestion, by long-term storage, e.g. 30 days, sufficient for resonably complete decay of the organic material. Large covered reservoirs are employed to provide the long residence time and to avoid escape of obnoxious gases; nevertheless the residual solids after anaerobic digestion may still comprise 40–50% of the original volume of excess sludge. Sludge treatment and disposal is expensive and typically represent 35–40% of the total cost of a secondary waste water treatment.

Auto-oxidation (endogenous respiration) is a well-known phenomenon in the aerobic treatment of waste fluid by the activated sludge process. In the presence of ample dissolved oxygen but in the absence of large amounts of readily available organic nutrient (from waste fluid), the bacteria comprising the sludge become self-consuming to some degree. Under such conditions there tends to be a reduction in the net rate of sludge production.

As practiced in prior art waste treatment plants, the rate of auto-oxidation is usually too low to have a significant effect on the net sludge production rate of the activated sludge process. Extended aeration is a well-known form of the activated sludge process which increases the degree of auto-oxidation and materially reduces the net production of sludge. In effect, the treatment tanks are greatly increased in size and/or number so that the retention time of the waste is extended from the 4–6 hours of common practice to at least 18–24 hours. Aeration (with air) is continued throughout this period. The retention time is much longer than required for BOD assimilation leaving a substantial period for auto-oxidation of the sludge. Extended-aeration plants are frequently operated with virtually zero net production of sludge and essentially 100% recycling of the settled sludge for mixing with the incoming waste fluid.

The disadvantages of the extended aeration plant are its large size and high operating costs. The treatment tank capacity must be 3–6 times larger than a conventional activated sludge plant in order to allow for the long hold-up time. In addition, the costs of supplying compressed air and agitation throughout the larger system and the longer treatment period are high per unit volume of waste processed.

It is an object of this invention to provide an improved method for treatment of BOD-containing water such as municipal waste, which is characterized by relatively low net sludge production.

Another object is to provide a method which is characterized by relatively low net sludge production yet does not require the relatively large treatment tank capacity of extended-aeration plants.

Still another object is to provide an improved waste treatment process affording relatively low net sludge production, relatively low treatment tank capacity and low aeration gas quantity requirements per unit quantity of processed waste fluid.

A further object is to provide a method for more rapid auto-oxidation of sludge derived from BOD-containing water.

Other objects and advantages of this invention will be apparent from the ensuing disclosure and appended claims.

SUMMARY

This invention relates to a method for treating BOD-containing water by oxygenation characterized by relatively low net yield of sludge.

In one embodiment of this method, BOD-containing water, recycled activated sludge and feed gas comprising at least 50% oxygen (by volume) are mixed in the contact aeration zone, the relatve quantities of BOD-containing water and activated recycled sludge being such as to maintain the volatile suspended solids content (MLVSS) at least at 3000 p.p.m. The oxygen-rich feed gas is introduced in sufficient quantity and rate to maintain the dissolved oxygen content (DO) of the mixture above about 0.5 p.p.m. A suspended activated sludge liquor containing oxygen is formed in the aeration zone along with unconsumed oxygen-containing gas. The latter comprises more than 20% oxygen (by volume), the balance being desorbed inert gas and reaction products such as nitrogen and carbon dioxide.

The suspended activated sludge is discharged from the aeration zone into a separate sludge stabilization zone where it is mixed with gas comprising at least 35% oxygen (by volume) in sufficient quantity and with sufficient contacting to form BOD-depleted activated sludge having lower BOD than the suspended activated sludge liquor of the contact aeration zone. Unconsumed oxygen-containing gas again results, and comprises more than 20% oxygen (by volume) with desorbed gas and reaction-product gases as the balance. The liquid-solid total contact time in the contact aeration and sludge stabilization zones is 20–90 minutes with at least 5 minutes contact aeration.

The BOD-depleted activated sludge is discharged from this sludge stabilization zone and passed to a separate auto-oxidation zone for mixing with gas comprising at least 35% oxygen (by volume). This mixing continues for a period of 30–210 minutes, and the oxygen-containing gas is introduced in sufficient quantity and rate to maintain the dissolved oxygen content of the mixture above 5 p.p.m. to form auto-oxidized sludge. During this step the conditions are such that the external nutrient supply (from the BOD-containing feed water) is substantially depleted because of assimilation in the preceding contact aeration and sludge stabilization steps. Accordingly there is insufficient nutrient (food) to sustain the heavy concentration of bacteria in the high DO environment. Under these conditions certain of the sludge bacteria lyse (die) and their cellular material are consumed by other viable bacteria at a sufficiently rapid rate so that there is a reduction in the sludge content. That is, during the auto-oxidation step of this invention the quantity of sludge consumed exceeds the quantity of sludge synthesized.

At least part of the sludge derived from the aforementioned oxygen gas mixing is withdrawn and returned to the BOD-containing water aeration zone as the activated sludge. Purified liquid, having been separated from the auto-oxidized sludge, may be passed to a waterway and any excess sludge not returned for aeration is further processed for disposal as desired.

The method of this invention has been successfully used to treat municipal sewage in a manner significantly more efficient than the conventional air aeration activated sludge method.

BRIEF DESCRIPTION OF THE DRAWINGS

FIG. 4 is a schematic view taken in cross-section elevation of apparatus arranged for series flow of oxygen gas and liquid-solid through four mixing zones.

Figure 1:
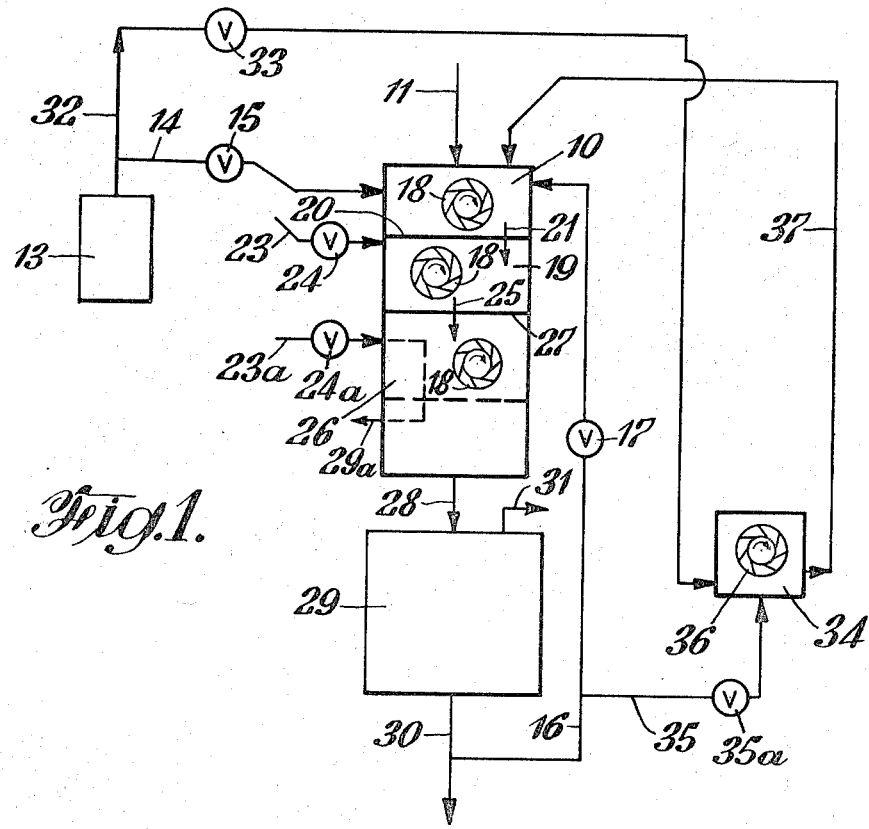
FIG. 1 is a schematic view of apparatus arranged to practice one embodiment wherein a clarified follows the auto-oxidation zone.

To practice this invention the contact aeration, sludge stabilization, and auto-oxidation zones must be distinct and separated, and the liquid-solid must flow only from the former to the latter in the direction of decreasing BOD concentration. The employment of liquid-solid staging through segregated zones is necessary to approach true "plug-flow" and thereby avoid intermixing of liquid-solid between the zones. At least two zones of mixed liquor aeration are required and herein identified as contact aeration and sludge stabilization. Contact aeration is the first or fed zone; since the liquor is completely mixed unassimilated BOD will exist throughout this zone. The suspended activated sludge discharged therefrom contains substantial bacterial food either dissolved or adsorbed on the floc and because this mixed liquor is passed on to the sludge stabilization zone, the food-depleted condition necessary for high rate auto-oxidation does not exist in either the first or the second aeration zone. To a considerable extent the latter comprises a sludge stabilization zone wherein the residual and adsorbed BOD is assimilated by the floc. Stated otherwise, BOD is not depleted as needed for high rate auto-oxidation until at least the third stage of oxygenation.

If BOD-rich sludge from the sludge stabilization zone were allowed to freely mix with BOD-depleted sludge from a downstream auto-oxidation zone, food would be supplied to the latter which would in turn tend to sustain the bacterial population and therefore diminish the desired tendency toward high-rate auto-oxidation. Conversely, if BOD-depleted sludge were allowed to backmix into the sludge stabilization zone the BOD strength in such zone would be diluted thereby reducing the desired high rate of BOD assimilation. Accordingly, at least three segregated zones or stages must be provided to achieve the advantages of this invention—one for contact aeration, one for BOD assimilation or stabilization and the third for auto-oxidation.

Another feature of this invention is the maintenance of high suspended solids concentration through the process, i.e. in the contact aeration, sludge stabilization and auto-oxidation zones. The BOD-containing water-activated sludge volatile suspended solids content is at least 3000 p.p.m. and preferably 5000–9000 p.p.m. One reason for this requirement is that the solids concentration in the contact aeration zone affects the rates of the biochemical reactions occurring in the method. In the treatment of municipal sewage the suspended solids comprise: (1) biologically oxidizable organic material, (2) non-biologically oxidizable organic material, and (3) non-oxidizable non-organic material. The non-organic material such as sand and grit, and the non-biologically oxidizable material such as polyethylene particles or paper are undesirable but unavoidable components of the BOD-containing water, e.g. sewage, entering the sludge synthesis zone. Normally relatively large particles, e.g. wood chips, are usually removed in a pretreatment step.

The major fraction of the total solids in the mixed liquor, e.g. 70% thereof, consists of bacterial floc (biomass) recirculated from the clarified to the aeration zone. The higher the concentration of bacteria, the more rapid will be the adsorption and assimilation of BOD, and the more quickly will the BOD/biomass ratio drop into the auto-oxidation range. With this ratio sufficiently depressed, auto-oxidation will proceed rapidly in the presence of other favorable environmental factors i.e., high volatile suspended solids level, high DO level, and an extremely active and viable biomass from the sludge stabilization zone.

The rate of activated sludge consumption in the auto-oxidation zone is directly related to the volatile suspended solids concentration in that zone. It would be possible to bring the sludge synthesis and sludge consumption into balance with volatile suspended solids concentration levels below 3000 p.p.m. but the rate of approach to such balance would be extremely slow, thus requiring an extremely long aeration time as in the prior art extended aeration process. With the high solids concentration in the aeration and sludge stabilization zones in combination with the other features of this invention, sludge synthesis and sludge consumption can be brought more nearly into balance within a relatively short contact time and consequently in small aeration chambers. That is, the total contact time for the three zones need be no more than about 5 hours whereas the corresponding time for conventional extended aeration waste treatment plants is at least 18–24 hours. Accordingly, the investment and operating costs are appreciably lower than prior art activated sludge systems which achieve a significant reduction in sludge production rate.

It should be understood that only a small fraction of the sludge passing through the auto-oxidation zone is consumed in order to balance the sludge synthesis rate. For example, for each 4000 p.p.m. of biologically active solids entering the contact aeration zone, perhaps 200 p.p.m. net production of new cells may occur in the sludge synthesis zone resulting in 4200 p.p.m. active solids being passed to the auto-oxidation zone. Thus only 200 p.p.m. active solids (5%) need be consumed by auto-oxidation in order to maintain the total active solids constant in the system.

Still another requirement of the instant method is high rates of oxygen dissolution and substantial DO levels in the contact aeration, sludge stabilization and auto-oxidation zones. While there is some evidence that oxygen can be adsorbed directly from the gas phase by the biomass, it appears that most of the oxygen is consumed from solution. Hence, the rate of oxygen dissolution into the water in the aeration zone is very important and unfortunately it is inherently slow with air, the saturation level of oxygen in 70° F. water under one atmosphere of air is only 9 p.p.m., and at DO levels approaching this value the driving force vanishes for dissolution of oxygen from air.

The highest oxygen demand in the system is in the contact aeration and sludge stabilization zones and since back-mixing of BOD-depleted activated sludge from the auto-oxidation zone is prevented, a relatively high concentration of BOD is available to the biomass (from the return activated sludge) in this zone. The combination of ample BOD and high concentration of biomass create conditions favorable to a rapid assimilation of BOD and rapid growth of sludge. Oxygen is consumed at a rapid rate, and with conventional air aeration techniques the dissolved oxygen level in the sludge synthesis zone drops to near zero. This not only limits the reaction rate but also risks the development of highly undesirable facultatively aerobic organisms. To avoid an oxygen-limiting environment the dissolved oxygen level in the aeration and sludge stabilization zones should be maintained above about 0.5 p.p.m. and preferably in the range of 2–5 p.p.m.

The aforementioned DO levels cannot be readily sustained under aeration-sludge stabilization conditions of this invention using conventional air aeration techniques. An aerating gas comprising at least 50% and preferably at least 90% oxygen (by volume) is required and the gas should be mixed with the returned activated sludge and BOD-containing water in an efficient manner to create a large interfacial area with minimal work on the fluids. At least one of the gas and liquid fluids of the contact aeration zone is continuously recirculated and contacted with the other fluid, the quantiy of oxygen feed gas and the rate and duration of such contacting being sufficient to maintain the desired DO level. The dissolved oxygen content of the contact aeration and sludge stabilization zone mixtures preferably should not exceed 5–10 p.p.m. because the work expended in achieving higher DO concentrations would tend to cause excessive attrition of the bacterial floc, reducing its agglomerate size and impairing its settling properties. Stated otherwise, the floc particles would be so small that the effluent becomes turbid and unsuitable for discharge into receiving waters. Moreover, the solids level of the recycle sludge drops sharply and as a consequence the desired high volatile suspended solids levels cannot be maintained. A liquid-solid total contact time of 20–90 minutes is sufficient in the contact aeration and sludge stabilization zones to assimilate the BID in the liquid and sludge, with at least 5 minutes contact aeration.

In the auto-oxidation zone the BOD supply from feed water is relatively low as having been expended in the contact aeration and sludge stabilization zones. Although the rate of oxygen assimilation is lower in the auto-oxidation zone, the DO level should nevertheless be maintained above 5 p.p.m. and preferably 10–15 p.p.m. Relatively high DO levels are desirable because the bacterial agglomerates become progressively larger in the direction of liquid-solid flow through the aeration, sludge stabilization and auto-oxidation zones, and the transfer of dissolved oxygen into the floc particles tends to become diffusion-limited. A DO level of at least 5 p.p.m. in the liquid-solid mixture overcomes this resistance and maintains high availability of oxygen to the biologically oxidizable organic material. DO levels above 15 p.p.m. can only be established by excessive attrition of the floc which in turn reduces its agglomerate size and impairs its settling properties. This in turn requires longer retention times in clarification to achieve a desired separation of auto-oxidized sludge and purified water.

The lower rate of oxygen assimilation in the auto-oxidation zone tends to reduce the quantity of oxygen gas required to maintain the desired greater than 5 p.p.m. DO level. However, to minimize attrition of the floc and enhance rapid settling of the auto-oxidized sludge, the aeration gas should comprise at least 35% oxygen (by volume). Lower oxygen concentrations would be characterized by excessive non-reactive gas, e.g. nitrogen in the instance of air, which constitutes an inert gaseous diluent and requires excessive agitation to compensate for the reduced oxygen partial pressure. Stated otherwise, the gas introduced to the auto-oxidation zone should comprise at least 35% oxygen to facilitate adequate oxygen assimilation for the required low input of contacting energy.

An auto-oxidation zone aeration time of at least 30 minutes is required to oxidize at least the major portion of the excess sludge, and a mixing time of more than 210 minutes should be avoided as the settleability of the auto-oxidized sludge tends to be reduced.

In a preferred embodiment the unconsumed oxygen-containing gas from the contact aeration zone is discharged therefrom and introduced to the sludge stabilization zone as the aforementioned at least 35% oxygen second gas required for mixing with the suspended activated sludge from the contact aeration zone. Also, the unconsumed oxygen-containing gas from the sludge stabilization zone is discharged therefrom and introduced to the auto-oxidation zone as the aforementioned at least 35% oxygen third gas required for mixing with the BOD-depleted sludge from the sludge stabilization zone. Accordingly, the oxygen gas flows in the same overall direction, i.e. co-current, as the liquid-solid mixture. Such staging of the gas through the zones greatly enhances the overall utilization of the oxygen in the feed gas to the aeration zone. Oxygen gas staging is dscribed more completely and claimed in the application "Staged Oxygenation of BOD-Containing Water," Cerial No. 838,500, filed simultaneously in the name of John R. McWhirter. In a still more preferred oxygen gas staged embodiment the feed (first) gas comprises at least 90% oxygen, the second gas comprises at least 70% oxygen, the third gas comprises at least 55% oxygen, and the unconsumed oxygen-containing gas discharged from the auto-oxidation zone comprises at least 30% oxygen.

In another preferred embodiment, supernatant liquid is separated from either the suspended activated sludge discharged from the aeration zone or from BOD-depleted activated sludge discharged from the sludge stabilization zone. This separation is performed in an intermediate-clarification zone, and the remaining more concentrated solids are directed to the next succeeding zone. In this "contact stabilization" embodiment the ratio of solids concentration in the auto-oxidation zone to the contact aeraion zone is preferably at least 3:1 and the vulumetric flow ratio of recycling sludge to BOD-containing water to the aeration zone is preferably less than 0.5:1. The first ratio insures high solids concentration in the recycling sludge which in turn permits relatively low recycle flow rate, hence reduced equipment size and lower power costs.

DESCRIPTION OF THE PREFERRED EMBODIMENTS

Referring now to the drawings, BOD-containing water as for example sewage, enters aeration zone 10 through conduit 11. An oxygen source comprising at least 50% oxygen is provided as for example container 13, and the oxygen gas is flowed therefrom through conduit 14 having control valve 15 therein to zone 10. Activated sludge also enters zone 10 through return conduit 16 having flow control valve 17.

The aforementioned streams are intimately mixed in zone 10 by mechanical agitation means 18. The latter may comprise motor-driven impellers located near the liquid surface or submerged below the surface, and the oxygen gas may be introduced through conduit 14 either above or below the liquid. Such apparatus is well-known to those skilled in the art and should be selected to achieve high contact area between the fluids with minimal work expenditure. Single-pass contactors should be designed to obtain extended contact time between gas and liquid. If the oxygen gas is sparged into the liquid, the bubbles should be small so that their total surface area is large and their buoyancy is low. Dissolution of oxygen is also aided by submerging the gas dispensing means to a depth in the liquid where the hydrostatic effect is significant. As previously discussed, at least one of the gas and liquid fluids of the contact aeration zone is recirculated for repeated contact with the other fluid in this zone.

Aerating devices are commonly rated by the so-called "air standard transfer efficiency" which identifies the capability of the device to disolve oxygen from air into zero DO tap water at 1 atmosphere pressure and 20° C. Suitable devices are those which have an air standard transfer efficiency of at least 1.5 lb. $O_2$ per HP-hr. For these purposes the power used in rating the device is the total power consumed both for agitating the liquor and for gas-liquor contacting.

The contact aeration zone 10 is separated from the sludge stabilization zone 19 as for example by deep baffles 20 to prevent back-mixing of liquid-solid between adjacent zones. If desired more than one sludge stabilization zone may be employed, but the total liquid-solid mixing time for the contact aeration and sludge stabilization zones is less than 90 minutes with at least 5 minutes for contact aeration. As used herein, "contact aeration zone" means sustained mixing of a particular oxygen gas quantity with a particular BOD-containing feed water and recycled activated sludge quantity. "Sludge stabilization zone" refers to mixing of a particular oxygen gas quantity with a particular suspended activated sludge quantity for sufficient duration to form BOD-depleted activated sludge having lower BOD and perhaps a higher DO than the activated sludge suspension of the contact areation zone. In the FIG. 1 embodiment additional baffles similar to beffle 20 may be provided across the enclosure to restrict flows and form more than one sludge stabilization zone.

The recycle activated sludge is returned to zone 10 through conduit 16 at a rate sufficient to provide volatile suspended solids content of at least 3000 p.p.m. With this concentration of volatiles, the total suspended solids content including non-volatiles (MLVSS) would normally be at last 4000 p.p.m. In commercial usage it may be expected that the BOD-containing feed water flow rate and its BOD may fluctuate, so that adjustment of the recycle activated sludge flow rate will be necessary to maintain the suspended solids content at the desired level. Such adjustment is provided by control valve 17. The oxygen gas flow to zone 10 may be adjusted by control valve 15 and the power input to the contacts adjusted to maintain the mixture's DO above 0.5 p.p.m.

The suspended activated sludge is synthesized in the contact aeration zone by virtue of the sustained mixing and oxygen absorption. This mixed fluid 21 is discharged from zone 10 to sludge stabilization zone 19 through flow restricted means as for example an opening in baffle 20 and preferably in a region remote from the point of BOD-containing feed water introduction. At the same time gas of reduced oxygen content collects above the liquor in zone 10 under a suitable cover or dome for discharge.

Gas containing at least 35% oxygen is introduced to sludge stabilization zone 19 through conduit 23 having flow control means 24. In a preferred method of practice this gas may comprise unconsumed oxygen from the contact aeration zone 10 plus gas reaction product and inert gases therefrom, e.g. carbon dioxide, nitrogen, argon and water vapor. Alternatively, the unconsumed oxygen-containing gas from the contact aeration zone 10 may be discharged therefrom and used for other purposes. As another variation, a portion of this gas may be introduced to sludge stabilization zone 19 through conduit 23 and another portion diverted through a conduit (not shown). It will be apparent that if this gas is not employed in the sludge stabilization zone 19, another source of oxygen containing gas is needed or means must be provided for introducing gas from source 13.

The suspended activated sludge and oxygen-containing gas are mixed in sludge stabilization zone 19 by mixing means 18, and the liquid-solid total contact time in the contact aeration and sludge stabilization zones is 20-90 minutes. The sludge stabilization zone mixer may be similar or identical to contact aeration zone mixer 18. If necessary, adjustable means (not shown) may be provided to control the flow of suspended activated sludge from zone 10 to zone 19. For example, the mixture could be withdrawn from zone 10 through a conduit for introduction to zone 19, with flow controlled by a valve. The input of contacting energy and/or the oxygen-containing gas flow rate through valve 24 may be adjusted by valve 24 to maintain the DO of the mixture in sludge stabilization zone 19 at above 0.5 p.p.m. and above the DO of zone 10.

The BOD-depleted activated sludge 25 formed in sludge stabilization zone 19 is discharged therefrom into auto-oxidation zone 26 separated from zone 10 by baffle 27. At the same time gas comprising at least 35% oxygen (by volume) is introduced in zone 26 through conduit 23a having control valve 24a therein. This gas is mixed with the sludge 25 in auto-oxidation zone 26 in sufficient quantity and with enough energy to maintain the DO of the mixture above 5 p.p.m. and preferably 10–15 p.p.m. The liquid-solid contact time in this zone is 30–210 minutes, so as to form partially auto-oxidized sludge.

If more than one auto-oxidation zone is desired, additional baffles (illustrated by a dotted line) may be positioned across the enclosure. As used herein the expression "auto-oxidation zone" means sustained mixing of a particular oxygen gas quantity with a particular BOD-depleted activated sludge from a sludge stabilization zone. If either or both quantities are mixed with different fluids under auto-oxidation conditions, i.e. wherein the dissolved oxygen content is above 5 p.p.m., at least two auto-oxidation zones are employed. However, the total contact time for liquid-solid in the auto-oxidation zone(s) is less than 210 minutes.

The auto-oxidation sludge is withdrawn from zone 26 through conduit 28 and passed to clarifier 29. The unconsumed oxygen-containing gas is discharged from zone 26 through conduit 29a. Clarifier constructions are well-known and may for example include a slowly rotating rake (not shown) at the conical bottom to prevent coning. In this vessel the auto-oxidized sludge settles to the lower end and is withdrawn through conduit 30. Either a portion or all of this auto-oxidized sludge is returned to the contact aeration zone 10 through conduit 16 and any remaining sludge is discarded through conduit 30. A clear purified effluent is drawn through conduit 31 and may be discharged to a waterway.

In an alternative embodiment a portion of the oxygen gas from source 13 is directed through conduit 32 having control valve 33 therein to zone 34 for premixing with at least part of the recycling activated sludge from conduit 35, branching from conduit 16. Control valve 35a may be provided in branch conduit 35 if needed. Mixing means 36 may for example be the same type of apparatus used in the contact aeration zone 10, sludge stabilization zone 19, and auto-oxidation zone 26. The premixed activated sludge-oxygen from zone 34 is introduced through conduit 37 to contact aeration zone 10 for mixing with the BOD-containing water in the same manner as in the previously described FIG. 1 system. As another variation, all of the oxygen gas may be premixed with recycling activated sludge in zone 34, so that none of the oxygen gas would be fed directly to contact aeration zone 10 through conduit 14. With either of these embodiments the aforedescribed method limitations must still be practiced in zone 10 to realize the advantages of the invention. That is, the volatile suspended solids content must be at least 3000 p.p.m., the liquid-solid total contact time in the aeration and sludge stabilization zones must be 20-90 minutes, with at least 5 minutes aeration and the dissolved oxygen content of the mixture must be above about 0.5 p.p.m.

Figure 2:
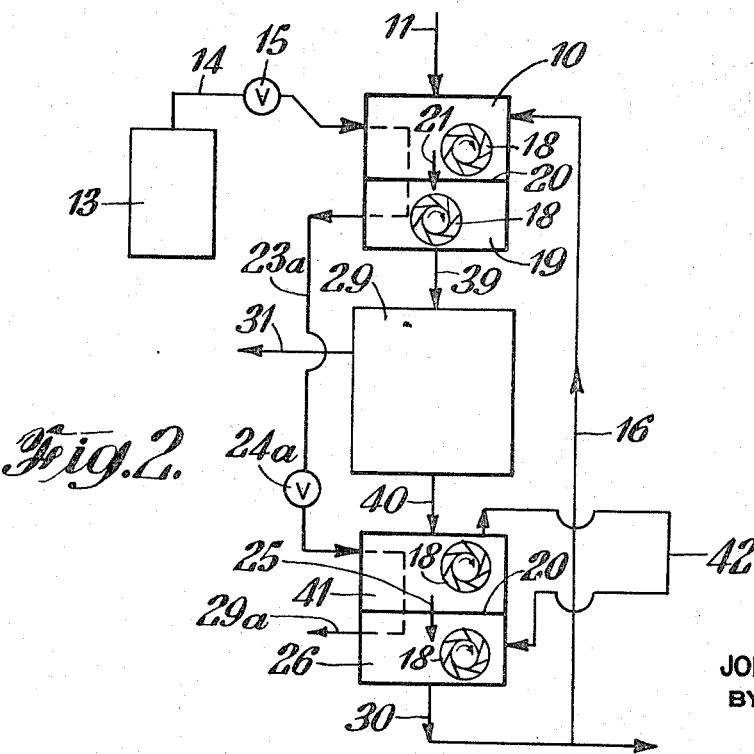
FIG. 2 is a schematic view of another embodiment wherein the clarifier is positioned between the sludge stabilization and auto-oxidation zones.

In the FIG. 2 embodiment, clarification zone 29 is positioned upstream of auto-oxidation zone 26 instead of following same as in FIG. 1. If desired, clarification zone 27 may be positioned still further upstream ahead of sludge stabilization zone 19. As shown in FIG. 2, the sludge stabilization zone is divided into two sections or stages, first section 19 located upstream clarification zone 29 and second section 41 located downstream zone 29.

The advantage of the FIG. 2 embodiment is that only the reduced volume stream of concentrated activated sludge is processed in the treatment zones downstream of the clarification zone 29. More specifically, the BOD-containing water may be mixed with oxygen gas and activated sludge in zones 10 and 19 for sufficient time to absorb and assimilate the BOD onto and into the sludge floc and thereby produce a disposable water effluent. This period may be relatively short, e.g., 15 to 45 minutes, if only the contact aeration step is performed before clarification. The activated sludge suspension is discharged from zone 19 through conduit 39 to clarifier 29 where the supernatant effluent is separated and withdrawn in conduit 31.

In a preferred embodiment wherein clarification zone 29 is positioned intermediate contact aeration zone 10 and auto-oxidation zone 26, as for example illustrated in FIG. 2, the ratio of solids concentration (both total solids and volatile solids) in the auto-oxidation zone to the contact aeration zone is at least 3:1 and the ratio of recycling sludge to BOD-containing water volume flow rates to the contact aeration zone is less than 0.5:1. Each of these characteristics permits substantial reduction in equipment and power costs by virtue of the small quantities of fluids processed.

The concentrated activated sludge is discharged from clarifier 29 through conduit 40 and to the extent that stabilization has been performed upstream of the clarifier the sludge will be at least partially BOD-depleted. The sludge is introduced to second sludge stabilization zone 41. Oxygen gas is introduced thereto through conduit 23a and assimilation of the absorbed BOD is completed so as to form a BOD-depleted, stabilized sludge 25. The latter is transferred through flow restriction means to auto-oxidation zone 26. Gas containing at least 35% oxygen is mixed with the stabilized sludge in zone 26. If its oxygen purity is at this level, the unconsumed oxygen-containing gas discharged from zone 41 through conduit 42 may comprise at least part of the gas introduced to auto-oxidation zone 26. In the FIG. 2 embodiment, the oxygen gas flows in series through the contact aeration step, the two steps of sludge stabilization, and the auto-oxidation step, the oxygen purity declining progressively along a path of reducing BOD concentration in the liquid solid.

Figure 3:
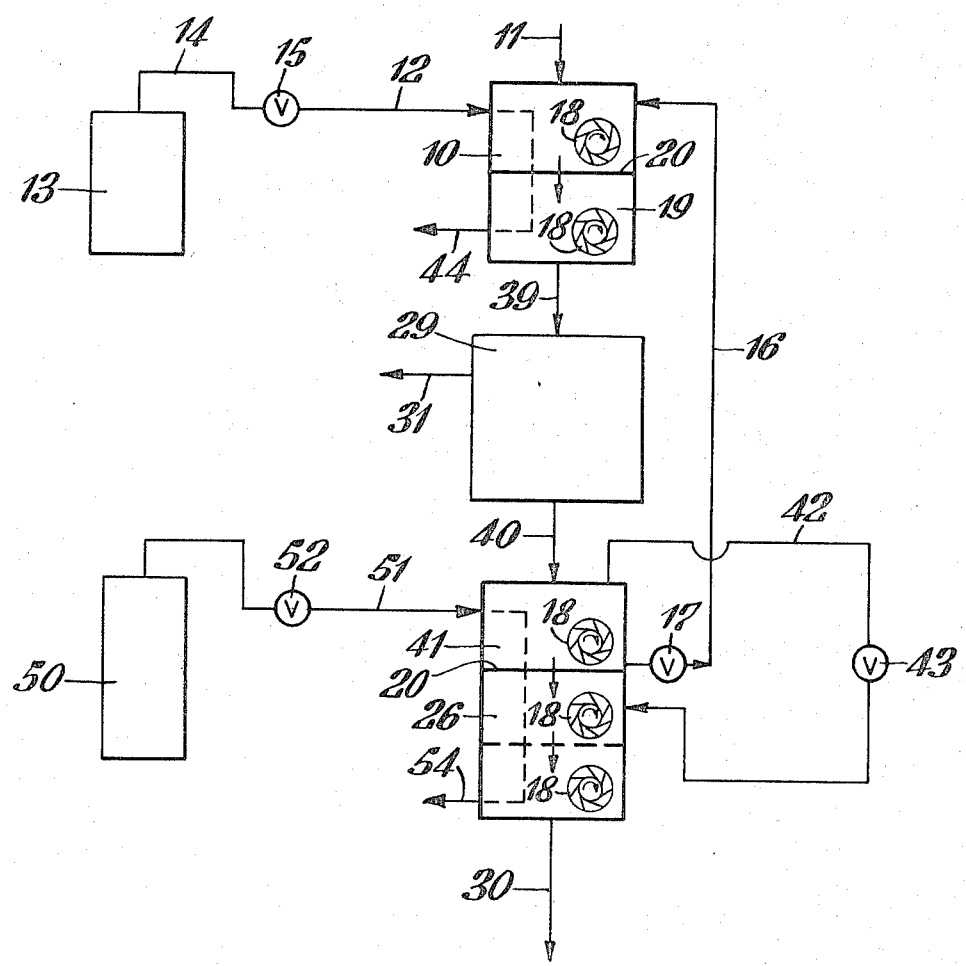
FIG. 3 is a schematic view of still another embodiment similar to FIG. 2 but with separate oxygen gas streams introduced to the contact aeration and auto-oxidation zones, and withdrawal of recycle activated sludge derived from mixed liquor in an intermediate zone which can be either sludge stabilization or auto-oxidation.

In FIG. 3, the unconsumed oxygen, reaction product and inert diluent gas from sludge stabilization zone 19 is discharged from the system through conduit 44. A second oxygen-containing gas source as for example container 50 is provided and communicates with second sludge stabilization zone 41 by conduit 51 having control valve 52 therein. This gas comprises at least 35% oxygen and preferably at least 50% oxygen, and the latter is of course partially consumed in further stabilization and auto-oxidation of the sludge bacteria. The unconsumed oxygen, reaction product, and inert diluent gas is discharged from the final auto-oxidation zone through conduit 54.

Another distinctive feature of the FIG. 3 system is withdrawal of sludge from an intermediate sludge stabilization zone 41 through conduit 16 and return of same to contact aeration zone 10 as the recycling activated sludge. This sludge has already been concentrated in clarification zone 29 and has been depleted of BOD in zone 41 but has not been subjected to intensive auto-oxidation in zone 26. One possible advantage of this particular embodiment is that the bacteria in the recycle sludge may be more active than in the FIGS. 1 and 2 systems where the recycle sludge is intensively auto-oxidized. A more active bacteria in turn accelerates the rate of BOD assimilation in contact aeration zone 10 and sludge synthesis zone 19.

FIG. 4 illustrates apparatus suitable for practicing the method of this invention and in particular the FIG. 1 embodiment with four separate chambers 60a, 60b, 60c and 60d for series staged gaseous oxygenation of liquor in enclosure 61, illustrated as a tank. A common cover 62 is provided for all chambers with a gas space beneath the cover and over the liquor. The gas spaces within first and second chambers 60a and 60b are separated by common partition 63a–b extending downwardly from cover 62 to the base of tank 61 and joined thereto in fluid-tight relation. Similarly, common partition 63b–c separates second and third chambers 60b and 60c while common partition 63c–d separates third and fourth chambers 60c and 60d. Oxygenated liquid-solid flow is provided by restricted flow opening 64 in the first-second chamber common partition 63a–b preferably near the bottom thereof, restricted opening 65 preferably in the upper portion of second-third chamber common partition 63b–c and restricted opening 66 preferably in the bottom portion of the third-fourth chamber common partition 63c–d. Restricted flow means for the oxygen-containing gas are provided in the common partitions 63a–b, 63b–c, and 63c–d and may comprise small perforations 67. Accordingly back-mixing of oxygen gas or oxygenated liquid-solid is avoided as long as a slight pressure differential is maintained. The fluids bow concurrently from chamber-to-chamber; this relation affords the highest possible oxygen absorption-assimilation rate per unit volume of BOD-containing water, and the highest treatment efficiency for a given total oxygenation time.

In the FIG. 4 embodiment, the BOD-containing water is introduced to first chamber 60a through conduit 11 and oxygen gas is introduced through conduit 14. The mixing means for each chamber includes a sparger 68 submerged in the liquid-solid and blades 69 of an agitation impeller preferably positioned immediately above the sparger. Blades 69 are joined by a rotatable shaft to suitable driving means, as for example an electric motor. The small oxygen gas bubbles discharged from the sparger 68 are distributed through the chamber in intimate contact with the liquid-solid by the agitation impeller and rise through the liquid-solid to the surface where the unconsumed portion disengages into the gas space along with reaction product gases and inert gas diluents. To provide the necessary pressure driving force for continuous circulation of oxygen gas through the chamber, the inlet of compressor or blower 70 is positioned in gas flow communication with the chamber gas space and the discharge thereof is directed through conduit 71 to sparger 68.

As previously indicated, the oxygenated liquid-solid and unconsumed oxygen gas flow sequentially from first chamber 60a through chambers 60b, 60c and 60d. The fluid streams and the mixing energy input to the chambers may be regulated so that the previously defined contact aeration step is performed in first chamber 60a and the auto-oxidized sludge is discharged from fourth chamber 60d through flow restricted conduit 72 to clarifier 73 for separation into purified water and concentrated auto-oxidized sludge. The sludge stabilization zone conditions are maintained in at least second chamber 60b and possibly third chamber 60c. Alternatively the latter may be operated as an auto-oxidation zone.

A slowly rotating rake 74 is provided at the lower end of clarifier 73 to prevent coning, and the activated sludge is withdrawn through bottom conduit 75. At least a portion of the withdrawn concentrated activated sludge is recycled through pump 76 to first oxygenation chamber 60a for mixing with the BOD-containing water and the oxygen feed gas. The activated sludge return rate may be adjusted by varying the speed of pump 76, thereby reflecting variations in BOD-containing feed water flow. Purified water is discharged from clarifier 73 through conduit 77.

The advantages of this invention were demonstrated in a series of tests using a system similar to FIG. 4 and municipal sewage as the BOD-containing water. Four 457-gallon oxygenation chambers were provided in a rectangular covered tank, 14 ft. long x 5 ft. wide x 4 ft. deep, fitted with interstage vertical baffles extending from top to bottom. The clarifier was a cylindrical wall-conical unit of 8 ft. diameter and 4½ ft. center depth. A bottom rake was rotated at 4 r.p.h. by a motor and speed reducer assembly. The auto-oxidized sludge from the fourth oxygenation chamber was introduced at a center concentric baffle in the clarifier upper end, and the concentrated sludge withdrawn at the center of the conical bottom.

The mixing system for each chamber consisted of a ½-HP motor-driven submerged variable speed axial flow 6-inch diameter impeller which dispersed gas from a stationary sparger located directly beneath the agitation impeller. The spargers were constructed of ½-inch diameter pipe with sixteen spaced 1/16-inch diameter orifices. A variable speed sliding vane rotary compressor was used to recirculate the oxygenating gas from the overhead gas space of each chamber back to the submerged sparger. The gas recirculation rate within each chamber and the mechanical mixing rate were separately and independently controlled, the gas recirculation rates being measured by rotameters and the mixer power measured by watt meters.

Oxygen gas at 99.5% purity was supplied from pressure-regulated liquid storage cylinders. The feed oxygen was saturated with water and then introduced into the gas space above the BOD-containing water and recycled activated sludge mixture in the first chamber. The unconsumed oxygen gas (plus disengaged inert diluent and reaction product gas) was conducted to each succeeding stage by a 24–30 inch length of two-inch diameter tubing joining openings through the cover over adjacent chambers. These inter-connections were of such size as to provide restricted sequential gas flow from the first to the fourth oxygenation chamber under a stage-to-stage pressure differential of about 0.12-inch $H_2O$. The liquid-solid mixture flowed in the general pattern illustrated by arrows in FIG. 4, and the restricted openings 64, 65 and 66 each consisted of eight 2-inch diameter holes providing a total flow area between adjacent stages of about 25 in.$^2$.

Table A is a summary of average values for a continuous operating period of 14 days. The raw sewage feed rate and the sludge recycle rate were held constant at 10 g.p.m. and 1.6 g.p.m. respectively. Other operating conditions were maintained as steady as possible and the principal fluctuation on the system was a diurnal variation in BOD concentration of the feed. This produced a cyclic variation in DO level in the first oxygenation chamber between about 0.5 p.p.m. during the day and about 3.0 p.p.m. during the night, the 24 hour average being about 0.8 p.p.m. All measurements summarized in Table A were performed in accordance with the procedures outlined in "Standard Methods for the Examination of Water and Wastewater Including Bottom Sediments and Sludges," 11th Ed., 1962.

TABLE A

| | |
|---|---|
| Feed rate, g.p.m. | 10 |
| Feed temperature, ° F. | 72 |
| Feed suspended solids, p.p.m. | 150 |
| Feed BOD, p.p.m. | 225 |
| Means liquid-solid contact time for each chamber, minutes | 39 |
| Average MLSS in all four chambers, p.p.m. | 5,500 |
| Average MLVSS in all four chambers, p.p.m. | 3,800 |
| Sludge recycle rate, g.p.m. | 1.6 |
| Ratio of sludge recycle to feed rate | 0.16:1 |
| Recycle sludge concentration, p.p.m. MLSS | 36,500 |
| Recycle sludge MLVSS, p.p.m. | 25,500 |
| Effluent water BOD, p.p.m.[1] | 22 |
| Average effluent water MLSS concentration, p.p.m. | 20 |
| Mixed liquor settling rate, ft./hr. (avg.) | 6.0 |
| Average mixed liquor sludge volume index | 50 |
| Food/Biomass ratio, lb. $BOD_5$/day × lb. MLVSS | 0.5 |
| DO: | |
|     Chamber 1, p.p.m. | 0.8 |
|     Chamber 2, p.p.m. | 3 |
|     Chamber 3, p.p.m. | 4 |
|     Chamber 4, p.p.m. | 7 |
| BOD: | |
|     Chamber 1, p.p.m.[1] | 50 |
|     Chamber 2, p.p.m.[1] | 33 |
|     Chamber 3, p.p.m.[1] | 30 |
|     Chamber 4, p.p.m.[1] | 25 |
| $O_2$ content of entering gas: | |
|     Chamber 1, vol. percent | 99.5 |
|     Chamber 2, vol. percent | [2] 90 |
|     Chamber 3, vol. percent | [2] 85 |
|     Chamber 4, vol. percent | [2] 77 |
| $O_2$ content of vent gas from Chamber 4, vol. percent | [2] 65 |

[1] Determinations made on supernatant liquid from sample after 30 minutes settling and includes unfiltered suspended solids.
[2] Estimated:
MLSS is total suspended solids (organic and inorganic)
MLVSS is total volatile organic solids.

No sludge was discharged from the system during the period. All of the sludge discharged from the clarifier was recycled to the first oxygenation chamber. While some sludge buildup occurred in the clarifier, the accumulation was only 35 to 60% of that predicted by the prior art using published values of the "$a$" and "$b$" constants for the well-known equation:

$$\Delta S = a\Delta L - bVSS$$

where

ΔS=lb. net sludge produced/day
$a$=cell yield coefficient (lb. sludge produced/lb. $BOD_5$ removed)
ΔL=lb. $BOD_5$ removed/day
$b$=endogenous respiration coefficient
VSS=lb. MLVSS under oxygenation More specifically, the actual increase in sludge inventory (based on calculations from the recorded data) was 82 lbs. whereas the increase was expected to be between 124 and 194 lbs, based on the prior art teachings. The 124 lb. value was based on $a=0.534$ and $b=0.015$. The 194 lb. value was based on $a=0.729$ and $b=0.003$. Reference: Jenkins, D. and Menar, A. B., "The Fate of Phosphorus in Sewage Treatment Processes—Part I," Report No. 67–6, Sanitary Engineering Research Laboratory, University of California, Berkley, May 1967.

It should be noted that the average value of the food/biomass ratio given in Table A (0.5 $BOD_5$/day×lb. MLVSS) is based upon the total volatile suspended solids in all aeration stages of the method, including the auto-oxidation stage or stages. Whereas an average value of the ratio is appropriate for a completely mixed liquor method of the prior art, it is not truly descriptive of the staged method of the present invention. In this method the BOD is not uniformly distributed through all the biomass in the system but is confined by the partitions to the biomass in the contact aeration stage. Thus, in the four-stage system of Table A, the BOD is initially distributed through only ¼ of the total biomass and the food/biomass ratio in the BOD-containing water feed stage is four times the average value or 2.0. In this stage the rich content of food in the mixed liquor, the relatively high concentration of MLVSS, and the ample supply of dissolved oxygen promote rapid absorption and assimilation of the BOD. As a consequence the BOD is depleted in the auto-oxidation zone and the food/biomass ratio is only about 0.2 or ⅒ that in the BOD-containing water feed stage. Under the latter conditions, coupled with high DO level, cell lysis and auto-oxidation are promoted.

A reduction in the yield of excess sludge of 42 lbs. in 13 days operation of the test plant represents a substantial saving in investment and operating cost. Assuming that the excess sludge from the plant was handled for disposal at a typical concentration of 30,000 p.p.m., the volume of excess sludge corresponding to 42 lbs. of dry solids would be about 166 gallons. If this figure is scaled upward from the 10 g.p.m. capacity of the pilot plant to a five million gallon per day municipal treatment plant, the 13-day reduction in sludge yield would be about 57,600 gallons. The actual size reduction of dual anerobic digesters for processing the 30,000 p.p.m. sludge can be substantially greater than this number if sludge retention in the digester is within a 15–30 day period as normally practiced. For example, the total size reduction of dual digesters operating with 30-day retention would be about 266,000 gallons. Other costs associated with sludge disposal would also be reduced, such as dewatering and incineration.

Comparison of the Table A data with the process requirements for the contact aeration, sludge stabilization, and auto-oxidation steps reveals that the first chamber was operating under contact aeration conditions whereas the second and third chambers were operating under sludge stabilization conditions. The DO content of the first chamber's mixed liquor varied considerably (0.5–3.0 p.p.m.), whereas the DO content of the second and third chamber's mixed liquor was reasonably constant at a somewhat higher level of 3 and 4 p.p.m., respectively, indicating that BOD assimilation was progressing. The relatively high DO level of the fourth chamber (7 p.p.m.) and the relatively low BOD level (25 p.p.m.) indicate that auto-oxidation was occurring therein. That is, the food (BOD) available to the bacteria from the sewage had been depleted to the level where the bacteria were starved and became self-consuming.

Referring again to the foregoing equation for calculating ΔS, it is seen that the net rate of sludge production ΔS can be reduced, not only by increasing the endogenous respiration coefficient "$b$," but alternatively or additionally by decreasing the cell yield coefficient "$a$." A reduction in coefficient "$a$" means that a large fraction of the BOD consumed by the cells is used in cell maintenance and a smaller fraction for the production of new cells. Food consumed for cell maintenance is oxidized directly to $CO_2$ and water and thus does not increase the solids level in the system. There is evidence that the environmental conditions obtained in this invention not only increase the endogenous respiration coefficient "$b$," but also alter the bacterial composition of the biomass and/or the cell metabolism in a manner to reduce the cell yield coefficient "$a$."

In summary, this invention achieves a high rate of auto-oxidation and at most a low net yield of sludge. Exceptionally short liquid-solid mixing times are required for aeration, sludge stabilization and auto-oxidation. These characteristics are in turn reflected in greatly reduced volume of aeration basins, lower operating cost and elimination of at least part of the sludge disposal facilities.

Although certain embodiments have been described in detail, it will be appreciated that other embodiments are contemplated along with modifications of the disclosed features, as being within the scope of the invention.

What is claimed is:

1. In a method for treating BOD-containing water by aeration in contact with activated sludge, settling sludge from the aeration and recycling sludge to the aeration zone as said activated sludge, the improvement comprising:
    (a) introducing sufficient recycling sludge to the BOD-containing water aeration zone to provide volatile suspended solids content of at least 3000 p.p.m.;
    (b) introducing first gas comprising at least 50% oxygen (by volume) and mixing same as the aeration gas with the BOD-containing water and recycled sludge in the aeration zone for liquid-solid contact time of at least 5 minutes in sufficient quantity and rate to maintain the dissolved oxygen content (DO) of the mixture above about 0.5 p.p.m. and form suspended activated sludge;
    (c) discharging said suspended activated sludge from the aeration zone into a separate sludge stabilization zone;
    (d) introducing second gas comprising at least 35% oxygen (by volume) and mixing same with said suspended activated sludge in said sludge stabilization zone in sufficient quantity and rate to form BOD-depleted activated sludge having lower BOD than said suspended activated sludge, the liquid-solid total contact time in said aeration and sludge stabilization zones being 20–90 minutes;
    (e) discharging said BOD-depleted activated sludge from the sludge stabilization zone into a separate auto-oxidation zone;
    (f) introducing third gas comprising at least 35% oxygen (by volume) and mixing same with said BOD-depleted activated sludge in said auto-oxidation zone in sufficient quantity and rate to maintain the DO of such mixture above 5 p.p.m. with liquid-solid contact time of 30–210 minutes to form auto-oxidized sludge; and
    (g) withdrawing and returning at least part of sludge derived from the oxygen gas mixing to the BOD-containing water aeration zone as said recycling sludge.

2. A method according to claim 1 wherein sewage comprises said BOD-containing water.

3. A method according to claim 2 wherein the volatile suspended solid content in said aeration zone is 5000–9000 p.p.m.

4. A method according to claim 2 wherein the DO in said aeration and sludge stabilization zones is 2–5 p.p.m.

5. A method according to claim 2 wherein the DO in said auto-oxidation zone is 10–15 p.p.m.

6. A method according to claim 1 wherein unconsumed oxygen-containing gas from said aeration zone is flowed to said sludge stabilization zone as said second gas, and unconsumed oxygen-containing gas from said sludge stabilization zone is flowed to said auto-oxidation zone as said third gas, and unconsumed oxygen-containing gas is discharged from said auto-oxidation zone comprising more than 21% oxygen.

7. A method according to claim 6 wherein said first gas comprises at least 90% oxygen, said second gas comprises at least 70% oxygen, said third gas comprises at least 55% oxygen, and the gas discharged from said auto-oxidation zone comprises at least 30% oxygen.

8. A method according to claim 1 wherein purified water is separated from said auto-oxidized sludge and at least part of the remaining solid comprises said recycling sludge introduced to said aeration zone.

9. A method according to claim 1 wherein supernatant liquid is separated from said suspended activated sludge and only the remaining solid is passed into said sludge stabilization zone.

10. A method according to claim 9 wherein the ratio of solids concentration in the auto-oxidation zone to the aeration zone is at least 3:1 and the ratio of recycling sludge to BOD-containing water volume flow rates to said aeration zone is less than 0.5:1.

11. A method according to claim 1 wherein supernatant liquid is separated from said BOD-depleted activated sludge and only the remaining solid is passed into said auto-oxidation zone.

12. A method according to claim 11 wherein the ratio of solids concentration in the auto-oxidation zone to the aeration zone is at least 3:1 and the ratio of recycling sludge to BOD-containing water volume flow rates to said aeration zone is less than 0.5:1.

13. A method according to claim 1 wherein said first gas comprises at least 90% oxygen.

References Cited

UNITED STATES PATENTS

| | | | |
|---|---|---|---|
| 1,286,017 | 11/1918 | Jones | 210—15X |
| 2,324,593 | 7/1943 | Persson et al. | 210—14 |
| 2,380,465 | 7/1945 | Proudman | 210—220X |
| 2,666,740 | 1/1954 | Gordon | 210—15 |
| 3,054,602 | 9/1962 | Proudman | 210—15X |
| 3,151,063 | 9/1964 | Gunson | 210—15X |
| 3,342,727 | 9/1967 | Bringle | 210—220X |
| 3,355,023 | 11/1967 | Foster | 210—195 |
| 3,356,609 | 12/1967 | Bruemmer | 210—7 |
| 3,401,113 | 9/1968 | Pruessner et al. | 210—15X |
| 3,412,017 | 11/1968 | Abson et al. | 210—7 |
| 3,462,275 | 8/1969 | Bellamy | 210—15X |

FOREIGN PATENTS

| | | | |
|---|---|---|---|
| 415,775 | 9/1934 | Great Britain | 210—220 |

OTHER REFERENCES

Grant, S., et al., The Oxygen Requirements of the activated Sludge Process, Sewage Works Journal, vol. 2, April 1930, pp. 228–244. (P.O.S.L.).

Pfeffer, J. T., et al., Oxygen-Enriched Air for Biological Waste Treatment, Water & Sewage Works, vol. 112, October 1965, pp. 381–384. (GP. 176).

Eckenfelder and McCabe, Process Design of Biological Oxidation Systems for Industrial Waste Treatment, Kings College, Newcastle, England (1960).

MICHAEL ROGERS, Primary Examiner

U.S. Cl. X.R.

210—6, 14, 195

UNITED STATES PATENT OFFICE
CERTIFICATE OF CORRECTION

Patent No. 3,547,814          Dated December 15, 1970

Inventor(s) John R. McWhirter

It is certified that error appears in the above-identified patent and that said Letters Patent are hereby corrected as shown below:

Disclosure

Column 1, line 56, delete "completed" and substitute -- complete --.

Column 2, line 69, delete "relatve" and substitute -- relative --.

Column 6, line 3, delete "BID" and substitute -- BOD --; and line 63, delete "Cerial" and substitute -- Serial --.

Column 7, line 37, delete "signiflcan" and substitute -- significant --.

Column 8, line 53, delete "10" and substitute -- 19 --.

Column 10, line 66, delete "bow" and substitute -- flow ·

Column 11, line 46, after "conical" insert -- bottom --.

Signed and sealed this 1st day of June 1971.

(SEAL)
Attest:

EDWARD M. FLETCHER, JR.              WILLIAM E. SCHUYLER, JR.
Attesting Officer                    Commissioner of Patents

FORM PO-1050 (10-69)